United States Patent
Roider

(10) Patent No.: US 9,348,098 B2
(45) Date of Patent: May 24, 2016

(54) OPTICAL PORT ADAPTED TO MATE WITH PLUGS OF DIFFERENT TYPES

(71) Applicant: Avago Technologies General IP (Singapore) Pte. Ltd., Singapore (SG)

(72) Inventor: Peter Roider, Regensburg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 152 days.

(21) Appl. No.: 14/249,431

(22) Filed: Apr. 10, 2014

(65) Prior Publication Data

US 2015/0293312 A1   Oct. 15, 2015

(51) Int. Cl.
G02B 6/38  (2006.01)
G02B 6/42  (2006.01)

(52) U.S. Cl.
CPC .............. G02B 6/389 (2013.01); G02B 6/3893 (2013.01); G02B 6/4292 (2013.01)

(58) Field of Classification Search
CPC ....................................................... G02B 6/389
See application file for complete search history.

(56) References Cited

U.S. PATENT DOCUMENTS

| | | | | |
|---|---|---|---|---|
| 5,671,310 A * | 9/1997 | Lin | ....................... | G02B 6/3869 385/78 |
| 5,936,263 A * | 8/1999 | Hashizume | .......... | G02B 6/4292 257/432 |
| 6,151,432 A * | 11/2000 | Nakajima | ............. | G02B 6/3831 385/55 |
| 6,250,817 B1 * | 6/2001 | Lampert | ............... | G02B 6/3879 385/137 |
| 6,419,402 B1 * | 7/2002 | Zimmel | ............... | G02B 6/3869 385/86 |
| 6,464,406 B1 * | 10/2002 | Yarita | .................. | G02B 6/3825 385/56 |

FOREIGN PATENT DOCUMENTS

| WO | WO 03076999 A1 * | 9/2003 | ........... G02B 6/3825 |
|---|---|---|---|
| WO | 2013100892 A1 | 7/2013 | |

* cited by examiner

*Primary Examiner* — Daniel Petkovsek

(57) ABSTRACT

An optical port is provided that is adapted to mate with optical plugs of at least first and second types. For example, the first type of optical plug may be a VLF-type optical plug and the second type of optical plug may be a non-VLF-type optical plug. The optical port has at least one first latching feature for engaging at least one first latching feature of a VLF-type optical plug with which the optical port may be mated. The optical port has at least one second latching feature for engaging at least one second latching feature of a non-VLF-type optical plug with which the optical port may be mated.

20 Claims, 4 Drawing Sheets

OPTICAL PORT ADAPTED TO MATE WITH PLUGS OF DIFFERENT TYPES

TECHNICAL FIELD OF THE INVENTION

The invention relates to optical ports used in optical communications systems. More particularly, the invention relates to an optical port that is adapted to mate with different types of plugs.

BACKGROUND OF THE INVENTION

Optical communications are used in a wide variety of applications for a wide variety of purposes. For example, in electrically-noisy environments, optical links rather than electrical links may be used to transmit signals due to the immunity of optical links to electromagnetic interference (EMI). An example of such an application is in a factory setting where electrical data transmission lines run alongside electrical power lines that generate large amounts of electrical noise. The electromagnetic noise generated by the power lines can be coupled from the power lines into the data transmission lines, resulting in corruption of the data being transmitted over the data transmission lines. Using optical links to transmit the data can eliminate such problems. As another example, optical links may be used in retail settings to network point-of-sales (POS) terminals. Using optical links for this purpose can eliminate the possibility of sales information being lost or corrupted due to electrical noise existing in the building. As another example, optical links may be used to connect test instruments in manufacturing automated test systems to ensure that correct test data is transferred to the test system controller. These are only a few examples of optical links over which optical communications occur.

In such optical links, an optical transmitter and an optical receiver are located at opposite ends of an optical fiber, which may be a glass optical fiber or a plastic optical fiber. The optical transmitter includes an electrical-to-optical (EO) converter, such as a light-emitting diode (LED) or laser diode, that receives an electrical signal and converts the electrical signal into an optical signal, which is then coupled into the end of the optical fiber. The optical receiver includes an optical-to-electrical (OE) converter, such as a photodiode, that converts the optical signal passing out of the end of the optical fiber into an electrical signal. The optical transmitter and the optical receiver are housing in respective housings that are referred to as optical ports. Each end of the optical fiber is terminated with an optical plug that is adapted to mate with the respective optical port.

One well known series of optical link components that are used for this purpose is the Versatile Link Family (VLF) of components. Although the VLF components are available in a variety of types, the latching configuration for latching the plugs to the ports is generally the same for all VLF types. Each VLF optical port has a pair of flexible arms that are spaced apart and shaped to form a receptacle. The flexible arms are adapted to latch with a latch feature disposed on a cylindrical ferrule of the VLF optical plug as the plug is inserted into the port. The latch feature of the cylindrical ferrule consists of a ridge that extends peripherally about a section of the ferrule, as will now be described with reference to FIG. 1.

FIG. 1 illustrates a side plan view of a pair of flexible arms 2a and 2b of a VLF optical port latched with a ridge 3 of a ferrule 4 of a VLF plug. For ease of illustration the VLF optical port and the VLF optical plug are not shown in FIG. 1. Inside of the VLF optical port, which is sometimes referred to as a header, the end 5 of the ferrule 4 abuts a stop feature 6 formed in an insert 7 of the optical port. The insert has a leadframe 8 embedded therein and a lens 9 formed therein. The leadframe 8 has an integrated circuit (IC) die 11 attached thereto. Electrically-conductive pins (not shown) of the optical port are used to electrically couple electrically-conductive contacts of the IC die 11 to electrically-conductive contacts of a printed circuit board (PCB) on which the port is mounted. The lens 9 couples light between the end of the optical fiber 13 disposed in the ferrule 4 and the IC die 11 of the port.

Although the VLF components work well together, VLF optical ports are not adapted to mate with non-VLF-type optical plugs, i.e., with optical plugs that are not part of the VLF family of components. It would be desirable to provide an optical port that has a versatility that allows it to mate with multiple types of optical plugs, including VLF-type optical plugs and non-VLF-type optical plugs. One advantage of such an optical port is that it would obviate the need, in some cases, to change out the optical port to accommodate the use of a non-VLF-type optical plug already in use in the system. Accordingly, a need exists for an optical port that is capable of mating with different types of optical plugs.

SUMMARY OF THE INVENTION

The invention is directed to an optical port adapted to mate with optical plugs of at least first and second types. The optical port comprises a port base and at least a first port receptacle. The port receptacle has a proximal end that is attached to the base and a distal end that extends away from the base. The receptacle has an opening therein that extends from the distal end thru the proximal end and into the base. The opening is defined by a receptacle wall having an inner surface and an outer surface. The receptacle has at least one first latching feature and at least one second latching feature. The first latching feature is adapted to engage at least one first latching feature of the optical plug of the first type when the optical plug of the first type is mated with the optical port. The second latching feature of the optical port is adapted to engage at least one second latching feature of the optical plug of the second type when the optical plug of the second type is mated with the optical port.

In accordance with an embodiment, the optical port is adapted to mate with a VLF-type optical plug and with a non-VLF-type optical plug. The optical port comprises a port base and at least a first port receptacle. The port receptacle has a proximal end that is attached to the base and a distal end that extends away from the base. The receptacle has an opening therein that extends from the distal end thru the proximal end and into the base. The opening is defined by a receptacle wall having an inner surface and an outer surface. The receptacle has at least one first latching feature and at least one second latching feature. The first latching feature is adapted to engage at least one first latching feature of the VLF-type optical plug when the VLF-type optical plug is mated with the optical port. The second latching feature of the optical port is adapted to engage at least one second latching feature of the non-VLF-type optical plug when the non-VLF-type optical plug is mated with the optical port. The first latching feature of the VLF-type optical plug is disposed on at least one outer surface of the VLF-type optical plug. The second latching feature of the non-VLF-type optical plug is disposed on at least one inner surface of the non-VLF-type optical plug. The first latching feature of the optical port is disposed on an inner surface of the port receptacle. The second latching feature of the optical port is disposed on an outer surface of the port receptacle.

These and other features and advantages of the invention will become apparent from the following description, drawings and claims.

DETAILED DESCRIPTION OF AN EXEMPLARY EMBODIMENT

Figure 1:
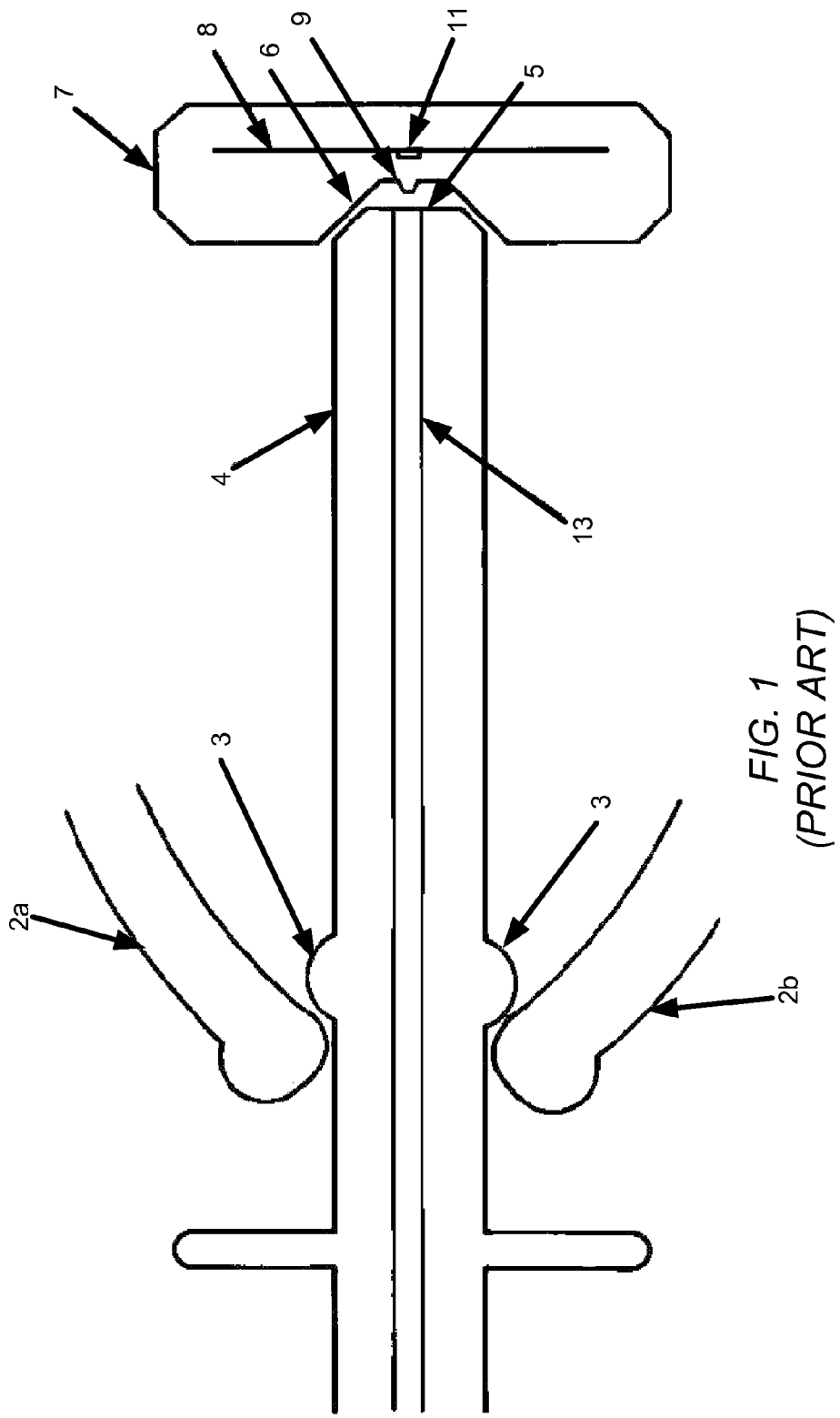
FIG. 1 illustrates a side plan view of a pair of flexible arms of a VLF optical port latched with a ridge of a ferrule of a VLF plug.

The invention is directed to an optical port that is configured, or adapted, to mate with optical plugs of at least first and second types. For example, the first type of optical plug may be a VLF-type optical plug and the second type of plug may be a non-VLF-type optical plug. The term "VLF-type optical plug," as that term is used herein, is intended to denote any optical plug having a ferrule similar or identical to the ferrule 4 shown in FIG. 1 having a ridge that acts as a latching feature similar or identical to the ridge 3 shown in FIG. 1. The aforementioned VLF of components includes a variety of optical plugs, also referred to as optical connectors, that meet this definition of a VLF-type optical plug, although there may also be VLF-type optical plugs that are not of the VLF of components that also meet this definition. The term "non-VLF-type optical plug," as that term is used herein, is intended to denote any optical plug that does not meet the foregoing definition of a VLF-type optical plug, and that has one or more mating features that allow the plug to mate with the optical port of the present invention.

The optical port has at least one first latching feature for engaging at least one first latching feature of a VLF-type optical plug with which the optical port can be mated. The optical port has at least one second latching feature for engaging at least one second latching feature of a non-VLF-type optical plug with which the optical port can be mated. An illustrative embodiment of the optical port will now be described with reference to FIGS. 2A-6, in which like reference numerals are used to identify like features, elements or components. It should be noted that features, elements or components in the figures are not necessarily drawn to scale.

Figure 2B:
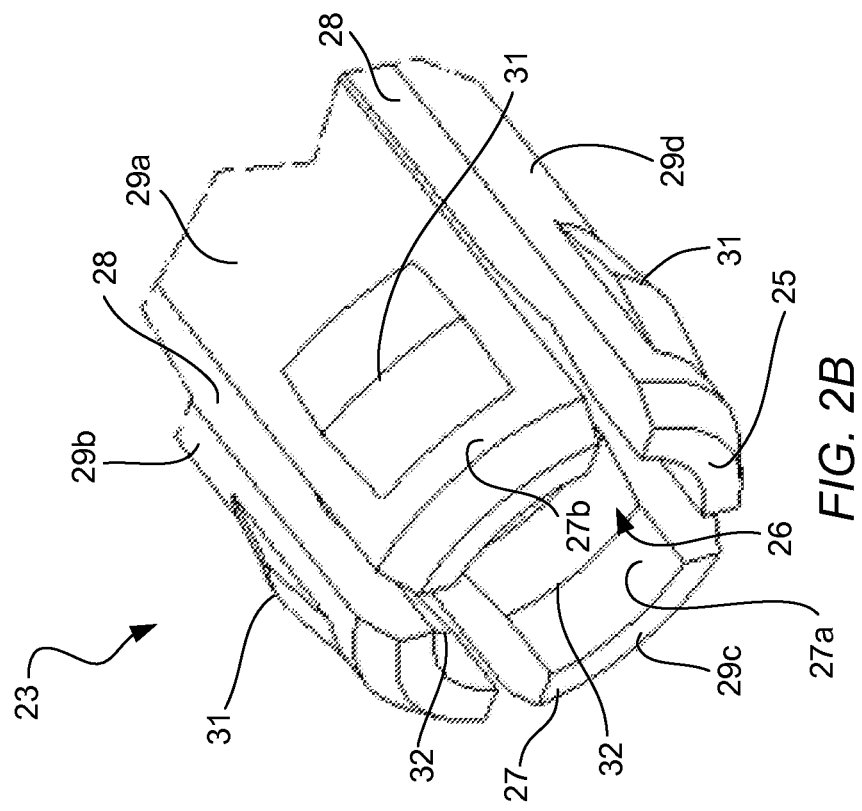
FIG. 2B illustrates an expanded top perspective view of the portion of the optical port shown in the circle labeled 21 in FIG. 2A.
Figure 2A:
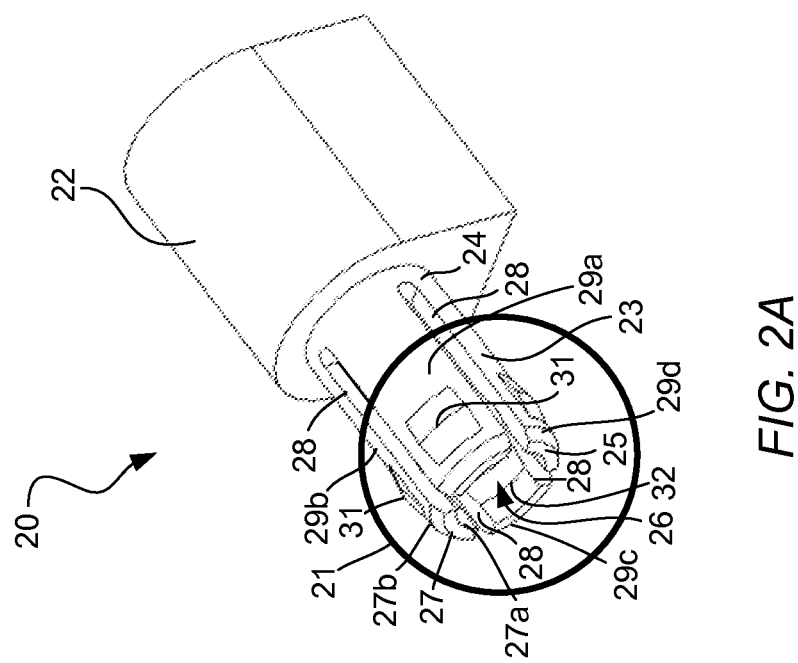
FIG. 2A illustrates a top perspective view of the optical port, or header, in accordance with an illustrative embodiment.
Figure 3:
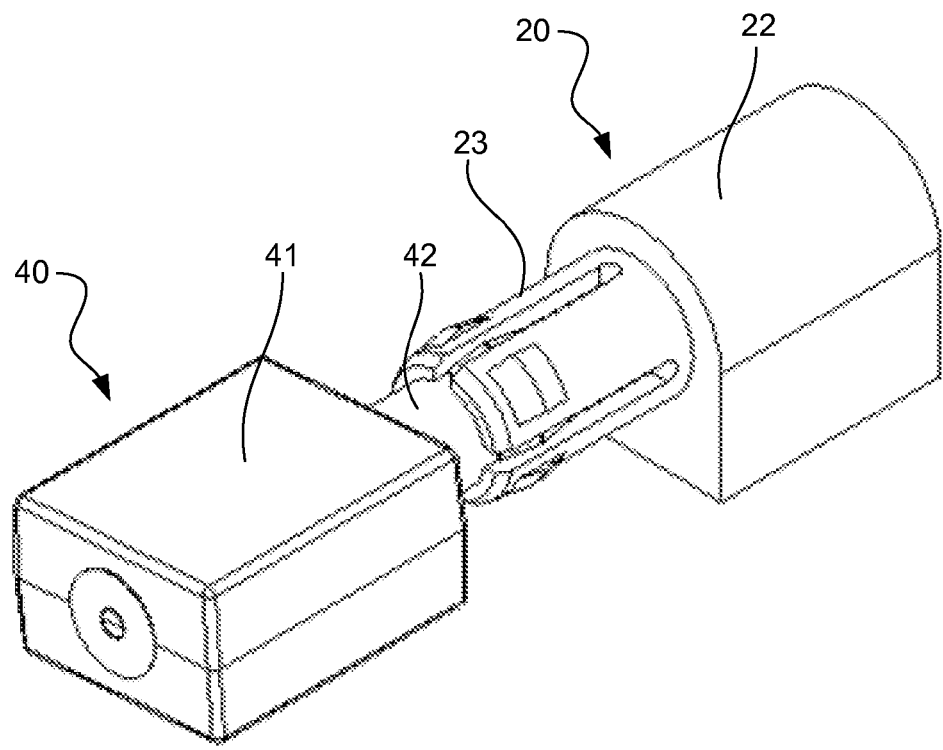
FIG. 3 illustrates a top perspective view of the optical port shown in FIG. 2A mated with a VLF-type optical plug.
Figure 4:
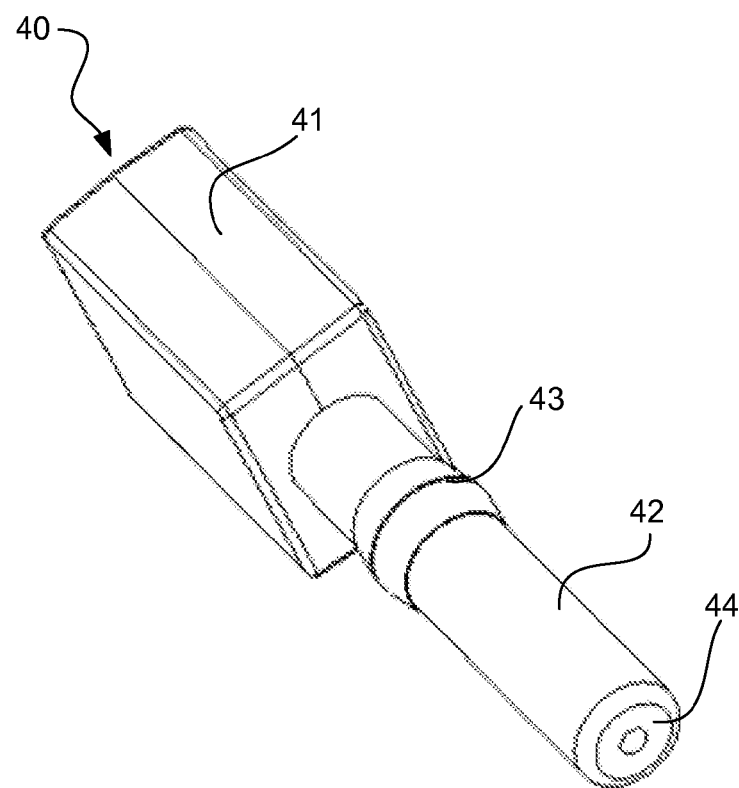
FIG. 4 illustrates a top perspective view of the VLF-type optical plug shown in FIG. 3.
Figure 5:
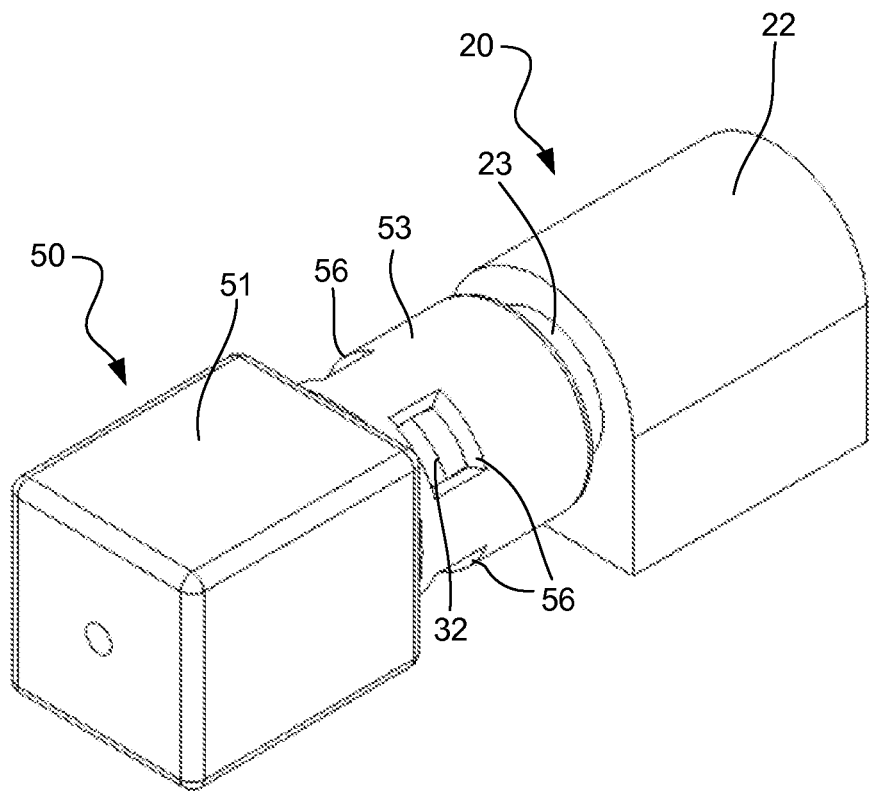
FIG. 5 illustrates a top perspective view of the optical port shown in FIG. 2A mated with a non-VLF-type optical plug.
Figure 6:
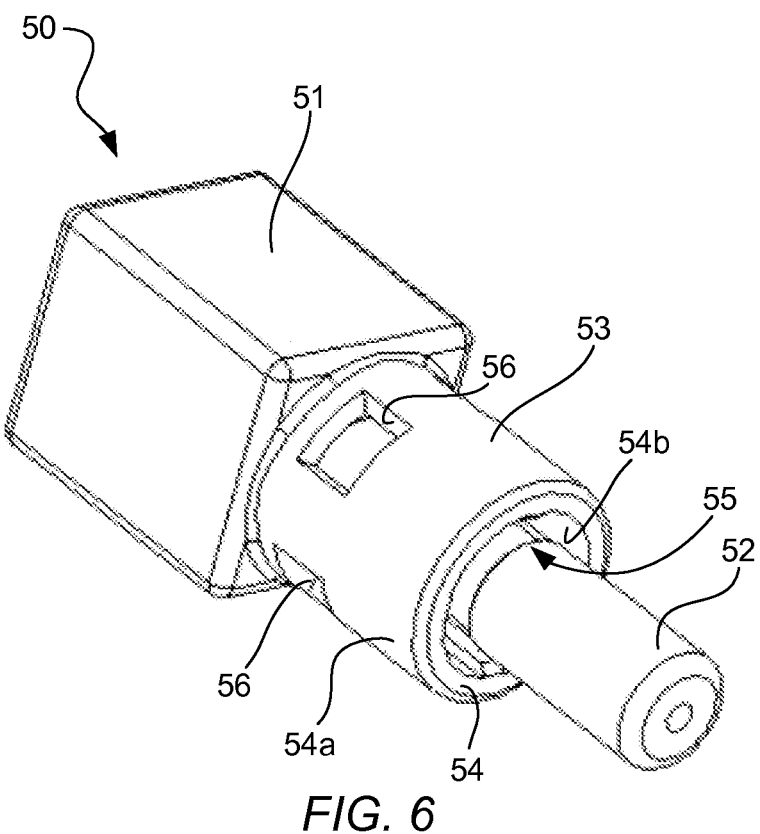
FIG. 6 illustrates a top perspective view of the non-VLF-type optical plug shown in FIG. 5.

FIG. 2A illustrates a top perspective view of the optical port, or header, 20 in accordance with an illustrative embodiment. FIG. 2B illustrates an expanded top perspective view of the portion of the optical port 20 shown in the circle labeled 21 in FIG. 2A. FIG. 3 illustrates a top perspective view of the optical port 20 shown in FIG. 2A mated with a VLF-type optical plug 40. FIG. 4 illustrates a top perspective view of the VLF-type optical plug 40 shown in FIG. 3. FIG. 5 illustrates a top perspective view of the optical port 20 shown in FIG. 2A mated with a non-VLF-type optical plug 50. FIG. 6 illustrates a top perspective view of the non-VLF-type optical plug 50 shown in FIG. 5.

With reference to FIGS. 2A and 2B, the optical port 20 has a port base 22 and a port receptacle 23. The receptacle 23 has a proximal end 24 that is attached to the base 22 and a distal end 25 that extends away from the base 22. The base 22 may contain components that are identical to the components 5-11 shown in FIG. 1. For illustrative purposes, it will be assumed that the base 22 contains the components 5-11 shown in FIG. 1, although it will be understood that the base 22 may have a variety of configurations therein and contain a variety of components. The invention is not limited with respect to the configuration of the base 22 or with respect to the components that are contained therein. The base 22 may also have a variety of shapes, and thus the invention also is not limited to the base 22 having any particular shape.

The receptacle 23 has an opening 26 therein that extends from the distal end 25 thru the proximal end 24 and into the base 22. The opening 26 is defined by a receptacle wall 27 having an inner surface 27a and an outer surface 27b. In accordance with this embodiment, the receptacle wall 27 has four slits 28 formed therein that extend thru the inner and outer surfaces 27a and 27b of the receptacle wall 27 and from the distal end 25 to stopping points that are proximate the proximal end 24. The slits 28 separate the receptacle wall 27 into four separate wings 29a-29d.

As can be more easily seen in FIG. 2B, the wings 29a-29d have respective outer ridges 31 thereon and respective inner ridges 32 thereon. All of the outer ridges 31 combined make up an outer ridge, although the outer ridge is segmented due to the slits 28. Similarly, all of the inner ridges 32 combined make up an inner ridge, although the inner ridge is segmented due to the slits 28. As will be described below in more detail with reference to FIG. 3, the inner ridge provides a latching feature for latching with a latching feature of a VLF-type optical plug. As will be described below in more detail with reference to FIG. 4, the outer ridge provides a latching feature for latching with a latching feature of a non-VLF-type optical plug.

The VLF-type plug 40 (FIGS. 3 and 4) has a plug housing 41 and a ferrule 42. The ferrule 42 has a ridge 43 (FIG. 4) thereon. The ferrule 42 and the ridge 43 may be identical to the ferrule 4 and ridge 3, respectively, shown in FIG. 1. When the ferrule 42 is fully inserted into the receptacle 23 of the optical port 20 as shown in FIG. 3, the end 44 (FIG. 4) of the ferrule 42 comes into abutment with a stop feature (not shown) formed in an insert (not shown) of the port 20. The stop feature and the insert of the optical port 20 may be identical to the stop feature 6 and the insert 7, respectively, shown in FIG. 1. The inner ridges 32 (FIG. 2B) perform the same function that the flexible arms 2a and 2b (FIG. 1) of the known VLF-type optical port perform. In particular, the inner ridges 32 of the receptacle 23 latch with the ridge 43 disposed on the ferrule 42 when the plug 40 is fully engaged with the port 20 as shown in FIG. 3.

The outer diameter of the ferrule 42 is slightly larger than the inner diameter of the inner ridge 32 (FIGS. 2A and 2B). Therefore, as the ferrule 42 is being inserted into the opening, the wings 29a-29d flex outwardly as the ridge 43 of the ferrule 42 comes into contact with the inner ridge 32. Once the ridge 43 of the ferrule 42 comes into contact with the sides of the inner ridge 32 that are closest to the base 22, the wings 29a-29d flex back inwardly and press against the outer surface of the ferrule 42.

The non-VLF-type optical plug 50 (FIGS. 5 and 6) has a plug housing 51, a ferrule 52 and a plug receptacle 53. The plug receptacle 53 has a wall 54 (FIG. 6) that is defined by outer and inner surfaces 54a and 54b (FIG. 6), respectively, of the receptacle 53. The inner surface 54b (FIG. 6) defines a cylindrical opening 55 (FIG. 6) that is coaxial with the ferrule 52. The cylindrical opening 55 has a diameter that is greater than an outer diameter of the ferrule 52 (FIG. 6) by an amount that is slightly greater than a thickness of the receptacle wall 27 (FIG. 2A) of the port 20. Windows 56 are formed in the wall 54 (FIG. 6) of the plug receptacle 53. The number of windows 56 is equal to the number of outer ridges 31 of the port receptacle 20 (FIGS. 2A and 2B).

When the optical port 20 and the optical plug 50 are fully engaged with one another as shown in FIG. 5, the ferrule 52 is within the port receptacle 23 and the port receptacle 23 is within the cylindrical opening 55 (FIG. 6) of the plug receptacle 53. In this fully-engaged position, the outer ridges 31 of the port receptacle 23 are latched within the respective windows 56 of the plug receptacle 53. During the process of mating the plug 50 and the port 20 with one another, the wings 29a-29d (FIGS. 2A and 2B) flex inwardly slightly as the outer ridges 31 of the port receptacle 23 come into contact with and press outwardly against the inner surface 54b (FIG. 6) of the wall 54 of the plug receptacle 53. Once the outer ridges 31 are received in the respective windows 56, the wings 29a-29d (FIGS. 2A and 2B) return to their unflexed, or nearly unflexed, states.

The bodies of the optical port 20 and of the optical plugs 40 and 50 are typically made of a hard plastic material, although other materials may be used for this purpose. As indicated above, the base 22 of the optical port 20 typically contains components that are similar or identical to components 5-11 shown in FIG. 1. The base 22 also typically contains electrically-conductive pins for making electrical connections with electrical contacts of a PCB (not shown) on which the optical port 20 may be mounted. The optical port 20 may have a variety of shapes and come in a variety of sizes. Also, although the optical port 20 is shown and described as being adapted to mate with an optical plug having a single ferrule, the optical port 20 may have multiple receptacles and an expanded base of multiple bases to allow it to mate with optical plugs having multiple ferrules, e.g., duplex optical plugs.

The illustrative embodiments described above demonstrate one example of an optical port 20 that is adapted to mate with at least two types of optical plugs, namely, a VLF-type optical plug 40 and a non-VLF-type optical plug 50. The optical port 20 has been shown and described as having a particular physical configuration that allows it to mate with the different plugs 40 and 50, but other physical configurations for the optical port are possible. Persons of skill in the art will understand, in view of the description being provided herein, that other physical configurations of the optical port can be realized by applying the principles and concepts of the present invention to achieve the same or similar goals. For example, although the port receptacle 23 has been shown and described as having four wings 29a-29d, it may have fewer than four or more than four wings. The reason for segmenting the port receptacle 23 into wings is to provide it with a sufficient amount of flexibility for mating with the optical plugs 40 and 50. There are other ways to provide the port receptacle 23 with the needed flexibility, as will be understood by those of skill in the art in view of the description provided herein. As another example, while the latching features of the non-VLF-type optical plug 50 have been described and shown as being windows 56 formed in the wall 54 of the plug receptacle 53, other types of latching features may be used for this purpose, such as indentations disposed at appropriate locations on the inner surface 54b of the wall 54 of the plug receptacle 53. Persons of skill in the art will understand, in view of the description being provided herein, that a variety of latching features may be used for this purpose.

It should be noted that the invention has been described with reference to illustrative embodiments and that the invention is not limited to these embodiments. Those skilled in the art will understand the manner in which modifications can be made to the illustrative embodiments and that all such modifications are within the scope of the invention. Persons skilled in the art will understand the manner in which modifications may be made to the embodiments described herein within the scope of the invention.

What is claimed is:

1. An optical port adapted to mate with a Versatile Link Family (VLF)-type optical plug and with a non-VLF-type optical plug, the optical port comprising:
    a port base; and
    at least a first port receptacle, the port receptacle having a proximal end that is attached to the base and a distal end that extends away from the base; the receptacle having an opening therein that extends from the distal end thru the proximal end and into the base, wherein the opening is defined by a receptacle wall having an inner surface and an outer surface, the receptacle wall having at least one first latching feature disposed on the inner surface and at least one second latching feature disposed on the outer surface, and wherein said at least one first latching feature disposed on the inner surface of the receptacle wall is adapted to engage at least one first latching feature of the VLF-type optical plug when the VLF-type optical plug is mated with the optical port, and wherein said at least one second latching feature disposed on the outer surface of the receptacle wall is adapted to engage at least one second latching feature of the non-VLF-type optical plug when the non-VLF-type optical plug is mated with the optical port.

2. The optical port of claim 1, wherein said at least one second latching feature of the non-VLF-type optical plug is at least one window formed in a wall of the non-VLF-type optical plug.

3. The optical port of claim 2, wherein the VLF-type optical plug includes a plug housing and a ferrule, the ferrule having a proximal end that is attached to the plug housing and a distal end that extends away from the plug housing, and wherein said at least one first latching feature of the VLF-type optical plug is a ridge disposed on an outer surface of the ferrule, and wherein said at least one first latching feature of the optical port is a ridge.

4. The optical port of claim 3, wherein the non-VLF-type optical plug includes a plug housing, a ferrule and a plug receptacle, the ferrule of the non-VLF-type optical plug having a proximal end that is attached to the plug housing of the non-VLF-type optical plug and a distal end that extends away from the plug housing of the non-VLF-type optical plug, and wherein said at least one second latching feature of the non-VLF-type optical plug is formed on at least an inner surface of a wall of the plug receptacle, and wherein said at least one second latching feature of the optical port is a ridge.

5. The optical port of claim 4, wherein the port receptacle has N slits formed therein that segment the port receptacle into N wings, wherein the N wings provide the port receptacle with flexibility that allows the port receptacle to flex outwardly when the VLF-type optical plug is mated with the optical port and to flex inwardly when the non-VLF-type optical plug is mated with the optical port, where N is a positive integer that is equal to or greater than one.

6. The optical port of claim 5, wherein N is equal to or greater than two.

7. The optical port of claim 5, wherein N is equal to or greater than three.

8. The optical port of claim 5, wherein N is equal to or greater than four.

9. The optical port of claim 5, wherein said at least one second latching feature of the non-VLF-type optical plug comprises N windows formed in the wall of the plug receptacle and extending thru the inner and outer surfaces of the plug receptacle, and wherein said at least one second latching feature of the optical port is a segmented ridge comprising N ridges disposed on the outer surface of the respective wings, and wherein the N windows engage the N ridges when the non-VLF-type optical plug is mated with the optical port.

10. The optical port of claim 2, wherein said at least one second latching feature disposed on the outer surface of the receptacle wall of the first port receptacle comprises a plurality of ridges, and said at least one window formed in the wall of the non-VLF-type optical plug comprises a plurality of windows that correspond in number to said plurality of ridges.

11. The optical port of claim 1, wherein the non-VLF-type optical plug includes a ferrule and a plug receptacle, the plug receptacle including a wall having at least one window that is operative as said at least one second latching feature of the non-VLF-type optical plug.

12. The optical port of claim 11, wherein said wall defines a cylindrical opening that is coaxial with said ferrule and has a diameter that is greater than an outer diameter of said ferrule.

13. An optical port adapted to mate with a Versatile Link Family (VLF)-type optical plug and with a non-VLF-type optical plug, the optical port comprising:
a port base; and
at least a first port receptacle, the port receptacle having a proximal end that is attached to the base and a distal end that extends away from the base; the receptacle having an opening therein that extends from the distal end thru the proximal end and into the base, wherein the opening is defined by a receptacle wall having an inner surface and an outer surface, the receptacle having at least one first latching feature and at least one second latching feature, and wherein said at least one first latching feature of the optical port is adapted to engage at least one first latching feature of the VLF-type optical plug when the VLF-type optical plug is mated with the optical port, and wherein said at least one second latching feature is adapted to engage at least one second latching feature of the non-VLF-type optical plug when the non-VLF-type optical plug is mated with the optical port, wherein said at least one first latching feature of the VLF-type optical plug is disposed on at least one outer surface of the VLF-type optical plug, wherein said at least one second latching feature of the non-VLF-type optical plug is disposed on at least one inner surface of the non-VLF-type optical plug, and wherein said at least one first latching feature of the optical port is disposed on an inner surface of the port receptacle, and wherein said at least one second latching feature of the optical port is disposed on an outer surface of the port receptacle.

14. The optical port of claim 13, wherein the VLF-type optical plug includes a plug housing and a ferrule, the ferrule having a proximal end that is attached to the plug housing and a distal end that extends away from the plug housing, and wherein said at least one first latching feature of the VLF-type optical plug is a ridge disposed on an outer surface of the ferrule, and wherein said at least one first latching feature of the optical port is a ridge disposed on an inner surface of the port receptacle.

15. The optical port of claim 14, wherein the non-VLF-type optical plug includes a plug housing, a ferrule and a plug receptacle, the ferrule of the non-VLF-type optical plug having a proximal end that is attached to the plug housing of the non-VLF-type optical plug and a distal end that extends away from the plug housing of the non-VLF-type optical plug, and wherein said at least one second latching feature of the non-VLF-type optical plug is formed on at least an inner surface of a wall of the plug receptacle, and wherein said at least one second latching feature of the optical port is a ridge disposed on an outer surface of the port receptacle.

16. The optical port of claim 15, wherein the port receptacle has N slits formed therein that segment the port receptacle into N wings, wherein the N wings provide the port receptacle with flexibility that allows the port receptacle to flex outwardly when the VLF-type optical plug is mated with the optical port and to flex inwardly when the non-VLF-type optical plug is mated with the optical port, where N is a positive integer that is equal to or greater than one.

17. The optical port of claim 16, wherein N is equal to or greater than two.

18. The optical port of claim 16, wherein N is equal to or greater than three.

19. The optical port of claim 16, wherein N is equal to or greater than four.

20. The optical port of claim 16, wherein said at least one second latching feature of the non-VLF-type optical plug comprises N windows formed in the wall of the plug receptacle and extending thru the inner and outer surfaces of the plug receptacle, and wherein said at least one second latching feature of the optical port is a segmented ridge comprising N ridges disposed on the outer surface of the respective wings, and wherein the N windows engage the N ridges when the non-VLF-type optical plug is mated with the optical port.

* * * * *